(12) United States Patent
Sugiyama et al.

(10) Patent No.: US 6,735,930 B2
(45) Date of Patent: May 18, 2004

(54) GRASS COLLECTION CONTAINER FOR LAWNMOWER

(75) Inventors: Takayoshi Sugiyama, Saitama (JP); Yasumi Fukuzumi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 40 days.

(21) Appl. No.: 10/102,016

(22) Filed: Mar. 21, 2002

(65) Prior Publication Data

US 2002/0144495 A1 Oct. 10, 2002

(30) Foreign Application Priority Data

Mar. 23, 2001 (JP) ........................................ 2001-086000

(51) Int. Cl.$^7$ ............................................... A01D 43/06
(52) U.S. Cl. ........................................................ 56/202
(58) Field of Search ............................ 56/202; 206/524.4

(56) References Cited

U.S. PATENT DOCUMENTS

| | | | | |
|---|---|---|---|---|
| 3,934,999 A | * | 1/1976 | Meier ................................ 71/9 |
| 4,377,063 A | * | 3/1983 | Leaphart ......................... 56/202 |
| 5,003,758 A | * | 4/1991 | Bernstein ......................... 56/202 |
| 5,042,241 A | * | 8/1991 | Boylston et al. ................ 56/202 |
| 5,524,423 A | * | 6/1996 | Haley .................................. 56/1 |
| 6,106,853 A | * | 8/2000 | Cox et al. ....................... 424/405 |

* cited by examiner

Primary Examiner—Robert E. Pezzuto
Assistant Examiner—Meredith Petravick
(74) Attorney, Agent, or Firm—Arent Fox Kintner Plotkin & Kahn

(57) ABSTRACT

A grass collection container for a lawnmower is provided to reduce the amount of blockage in an air-permeable region of the container. Materials, such as residual grass, that adhere to the container, cause the blockage. The grass collection container is made from cloth, sewn in the form of a bag, to collect grass that has been cut by a rotating cutting blade of the lawnmower and carried to the container by a flow of air. At least one section of the grass collection container is the air-permeable region that allows the flow of air to pass therethrough but does not allow the grass to pass therethrough. The air-permeable region carries thereon a photocatalyst that sterilizes and decomposes grass and organic materials. Therefore, the container is able to reduce the amount of blockage and suppress decay therein, thereby lowering the level of unpleasant odors.

5 Claims, 2 Drawing Sheets

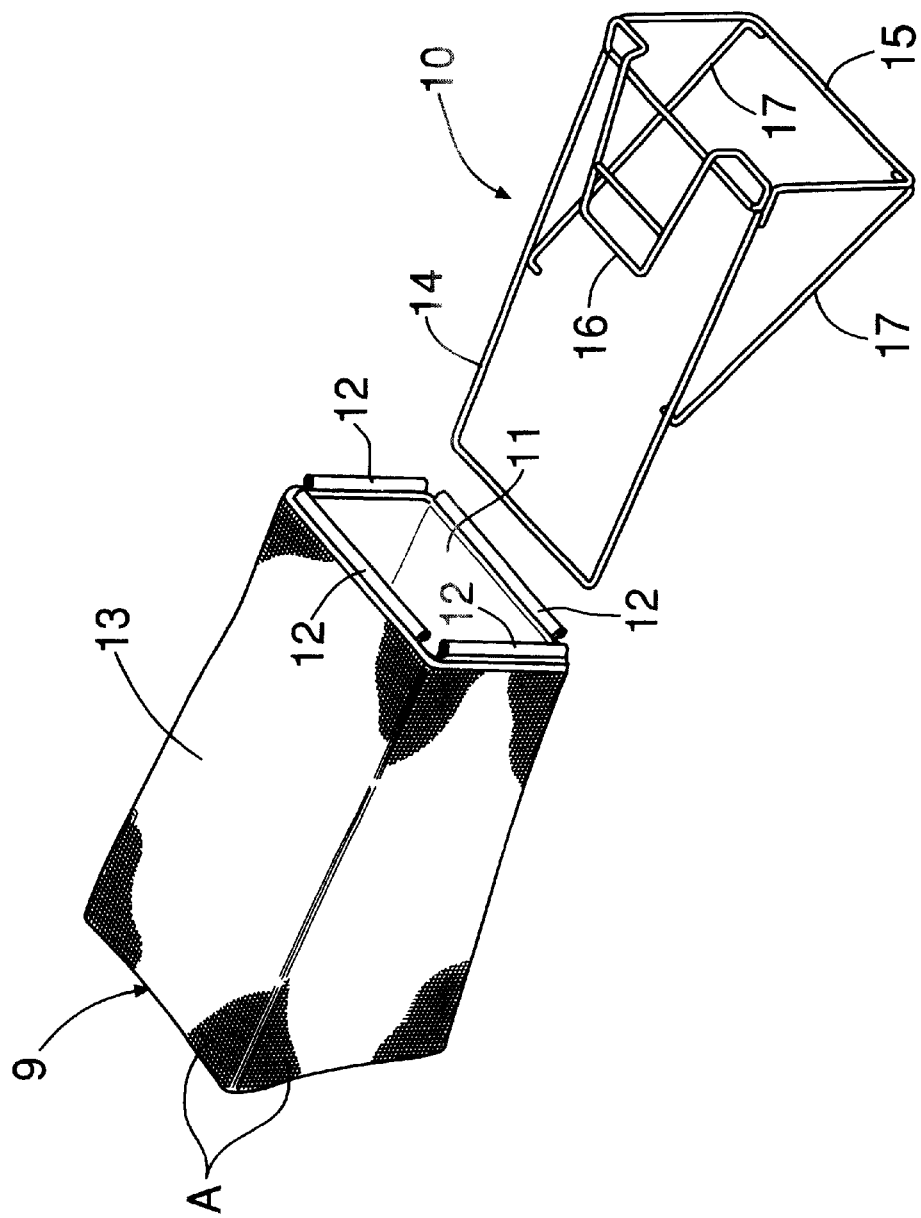

GRASS COLLECTION CONTAINER FOR LAWNMOWER

BACKGROUND OF THE INVENTION

1. Field of the Invention

The present invention relates to a grass collection container for a lawnmower. More specifically, the present invention relates to a grass collection container that collects grass that has been cut by a rotating cutting blade of the lawnmower and carried by a flow of air. At least one section of the grass collection container includes an air-permeable region that allows air to flow therethrough but does not allow the grass to pass therethrough.

2. Description of the Related Art

Conventionally, grass collection containers are often made by sewing cloth into the form of a bag, and the whole or a part of the cloth section is the air-permeable region.

Grass collected in a conventional grass collection container during a mowing operation is disposed of by shaking the container after the operation. However, a disadvantage of the conventional container is that grass and organic materials that have been trapped in gaps in the cloth bag, which forms the container, often remain attached to the interior of the container. These attached materials decay comparatively easily and later result in an unpleasant odor. Also, the decayed materials discharge as dust during the next lawn mowing operation and give an unpleasant sensation to the operator.

The present invention has been developed in view of the above-mentioned circumstances. It is an object of the present invention to provide a grass collection container for a lawnmower that reduces the occurrence of organic materials such as residual grass being trapped in the container and blocking the air-permeable region and therefore, to suppress decay, and lower the level of unpleasant odor.

SUMMARY OF THE INVENTION

In order to achieve the above-mentioned object, the present invention provides a grass collection container for a lawnmower that includes an air-permeable region on at least one section thereof. The grass collection container collects grass that has been cut by a rotating cutting blade and carried by the flow of air. The air-permeable region allows air to flow therethrough, but does not allow the grass to pass therethrough. The air-permeable region further carries thereon a photocatalyst.

Since the air-permeable region is where air passes through the container, if the region is formed using, for example cloth, gaps in the cloth are easily blocked by grass and organic materials. The grass and organic materials that are trapped in the gaps in the cloth tend to remain attached to the interior of the grass collection container even after the grass collection container is shaken for emptying after mowing the lawn. Thus, if the above-mentioned region carries thereon a photocatalyst, the photocatalyst exhibits a catalytic function when exposed to sunlight to promote the photolysis of moisture attached to the cloth (including moisture in the air), thereby forming hydroxyl radicals (.OH). These hydroxyl radicals have both a high binding energy and a high oxidizing power, and therefore exhibit a sterilization effect against microbes and a purification effect by decomposing attached grass and organic materials. The hydroxyl radicals reduce the blockage of grass and debris in the air-permeable region thereby suppressing decay. The residual attached materials can be easily removed from the gaps in the cloth by the flow of air during the next mowing operation. In order to allow the photocatalyst to fully exhibit its catalytic function, it is desirable for the lawnmower to be placed where the grass collection container can be exposed to sunlight. The above-mentioned catalytic function of the photocatalyst can also be exhibited very effectively while the mowing operation is carried out under sunlight.

The above and other objects, features and advantages of the invention will become apparent from the description of the preferred embodiment taken in conjunction with the accompanying drawings.

BRIEF DESCRIPTION OF THE SEVERAL VIEWS OF THE DRAWINGS

FIG. 2 is a perspective view of a grass collection container and a frame member, showing the relationship therebetween.

DETAILED DESCRIPTION OF THE PREFERRED EMBODIMENT

Figure 1:
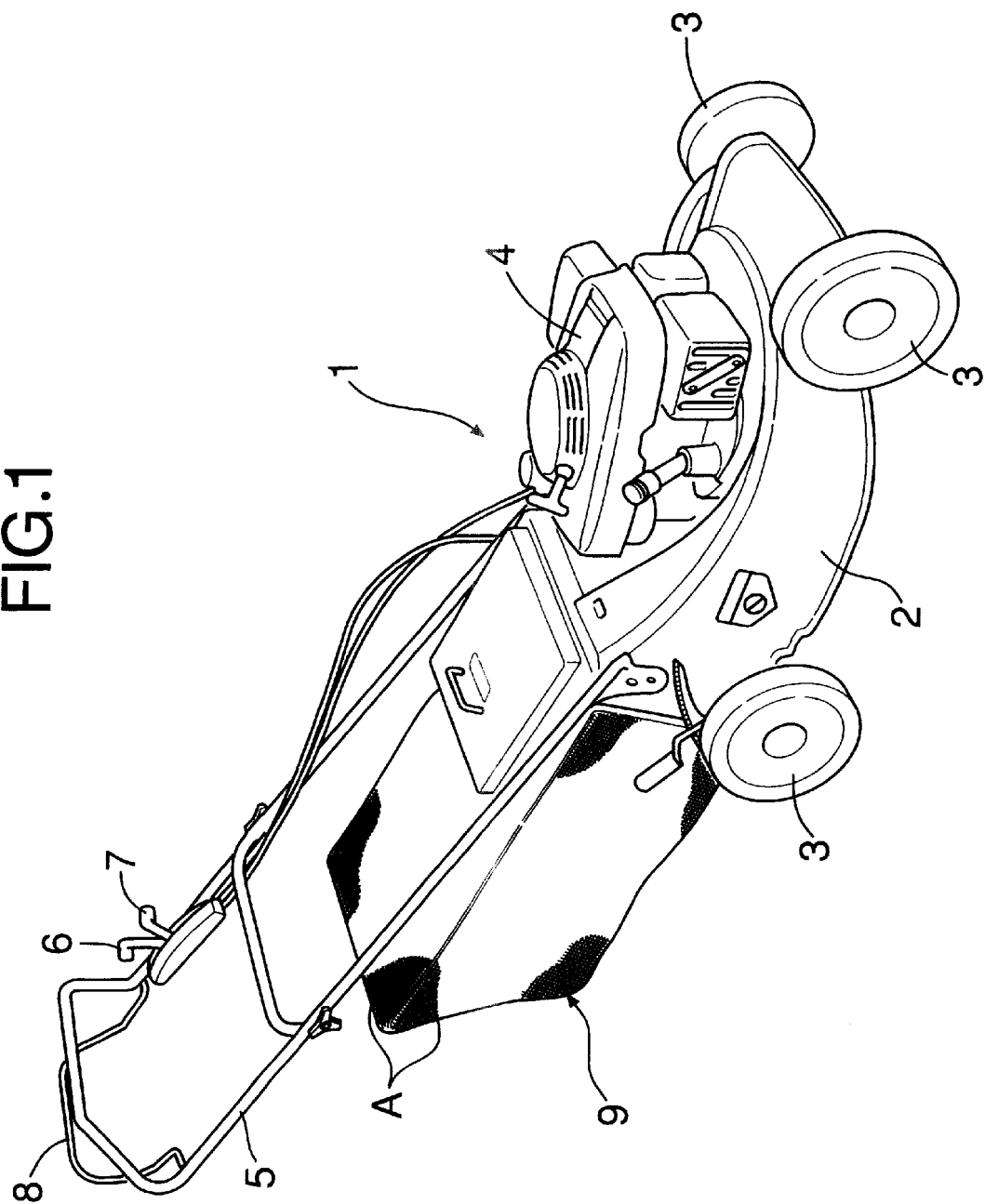
FIG. 1 is a perspective view of a lawnmower.

Referring to FIG. 1, a body 2 of a lawnmower 1 is provided with two wheels 3 at the front and two at the rear. Disposed on the lower side of the body 2 is a rotating cutting blade (not illustrated), and mounted on the upper side of the body 2 is an engine 4 for driving the rotating cutting blade and the rear wheels 3. Attached to the upper rear end of the body 2 are front ends of a handle 5 extending diagonally upwardly. Disposed on the rear side of the handle 5 are a gear shift lever 6, a throttle lever 7, and a clutch lever 8.

An outlet (not illustrated) for discharging the grass from the body 2 is provided on the rear end face of the body 2. A grass collection container 9 shown in FIG. 2 is detachably attached to the periphery of the outlet via a frame 10. The container collects grass that has been cut by the rotating cutting blade and carried therein by a flow of air. The grass collection container 9 is made by sewing nylon cloth into the form of a bottomed rectangular bag having its opening 11 positioned at the front and its bottom positioned at the rear. Attached to each of the four edges of the square opening 11 of the grass collection container 9 are clips 12 made of nylon, which have a curled engagement part. The frame member 10 includes a support part 14, a substantially square-shaped retaining part 15, a handle part 16, and two reinforcing parts 17 providing a connection between the retaining part 15 and the support part 14. The support part 14 supports, from the inside, an upper wall 13 of the grass collection container 9. The retaining part 15 is integral with the support part 14 and engages with the curled engagement part of each of the clips 12. The handle part 16 is integral with the retaining part 15 and is made so as to run along the outer face of the upper wall 13. The retaining part 15 is detachably attached to the periphery of the outlet of the body 2.

At least one part of the grass collection container 9 forms an air-permeable region A that allows air to flow therethrough but does not allow grass to pass therethrough. In the present embodiment, since the grass collection container 9 is made of nylon cloth, the entire grass collection container 9 is the air-permeable region A. Titanium dioxide is carried as a photocatalyst on the material forming the air-permeable region A. Specifically, titanium dioxide is carried on the nylon fiber forming the nylon cloth.

The titanium dioxide is carried by the following sol-gel method. Firstly, titanium dioxide fine particles are dispersed in water to obtain a sol. The grass collection container 9 is then immersed in the sol so as to impregnate it with the sol. The grass collection container 9 is then taken out of the sol to be dried, and heated up to 120° C. to 150° C., thereby carrying the titanium dioxide fine particles on the nylon fiber of the container 9.

Since the entire grass collection container 9 is the air-permeable region A, through which air can flow, the gaps in the cloth in the region A can be blocked by grass and organic materials. The grass and organic materials trapped in the gaps in the cloth tend to remain attached to the interior of the grass collection container 9 even after the grass collection container 9 is shaken for emptying after mowing the lawn. The titanium dioxide is therefore carried on the nylon fiber forming the region A. The titanium dioxide exhibits its catalytic function when exposed to sunlight, thereby promoting the photolysis of moisture attached to the nylon cloth (including moisture in the air) to form hydroxyl radicals (.OH). The hydroxyl radicals have both a high binding energy and a high oxidizing power and therefore exhibit a sterilization effect against microbes and a purification effect by decomposing grass and organic materials that are attached to the grass collection container. Thus, the blockage in the airpermeable region can be reduced and decay can be suppressed. The residual attached materials can be easily removed from the gaps in the cloth by the flow of air during the next mowing operation. In order to allow the titanium dioxide to fully exhibit its catalytic function, it is desirable for the lawnmower 1 to be placed where the grass collection container 9 can be exposed to sunlight. The above-mentioned catalytic action of titanium dioxide can also be exhibited very effectively while the mowing operation is carried out under sunlight.

In addition to titanium dioxide discussed above, zinc oxide, cadmium selenide, gallium arsenide, silicon carbide, and the like may be used as photocatalysts that exhibit a catalytic function when exposed to sunlight.

Other methods for carrying a photocatalyst on the grass collection container 9 include first carrying a photocatalyst on a fiber. Then, weaving the fiber to make a cloth, and sewing the cloth to make the grass collection container 9.

Furthermore, the grass collection container 9 may have a non-air-permeable region as well. It is also possible to form an air-permeable region of the grass collection container 9 with a wire mesh, or the like. In this case, a photocatalyst is carried on the wire mesh. Moreover, the present invention may be applied to a side-discharge-type mower grass collection container and a vehicle-type mower grass collection container.

In accordance with the arrangement of the present invention, a lawnmower grass collection container is provided to reduce the blockage in the air-permeable region caused by attached materials such as residual grass. As a result, the present invention suppresses decay and lowers unpleasant odors.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A grass collection container for a lawnmower comprising:

an air-permeable region on at least one section of a body of the grass collection container which collects grass that has been cut and carried from the lawnmower by a flow of air, the air-permeable region allowing only the flow of air to pass therethrough, and a photocatalyst coated or impregnated at least in the air-permeable region of the body of the grass collection container.

2. The grass collection container for a lawnmower according to claim 1, wherein the grass collection container is cloth and the entire grass collection container is the air-permeable region and the cloth carries thereon the photocatalyst.

3. The grass collection container for a lawnmower according to either claim 1 or claim 2, wherein the photocatalyst is titanium dioxide.

4. The grass collection container according to claim 2, wherein the cloth is nylon.

5. The grass collection container according to claim 2, wherein the grass collection container is in the form of a bag.

* * * * *